United States Patent [19]
Plunkett

[11] 4,093,900
[45] June 6, 1978

[54] DYNAMIC BRAKE BLENDING FOR AN INVERTER PROPULSION SYSTEM

[75] Inventor: Allan Barr Plunkett, Scotia, N.Y.

[73] Assignee: General Electric Company, Erie, Pa.

[21] Appl. No.: 713,491

[22] Filed: Aug. 11, 1976

[51] Int. Cl.² .............................................. H02P 3/22
[52] U.S. Cl. ..................................... 318/370; 318/376
[58] Field of Search ............... 318/370, 371, 375, 376, 318/379, 380

[56] References Cited

U.S. PATENT DOCUMENTS

| | | | |
|---|---|---|---|
| 3,657,625 | 4/1972 | Miller et al. | 318/370 |
| 3,774,095 | 11/1973 | Coccia | 318/371 |
| 3,815,002 | 6/1974 | Clemente et al. | 318/380 X |
| 3,890,551 | 6/1975 | Plunkett | 318/376 |
| 3,930,191 | 12/1975 | Loderer | 318/376 |

*Primary Examiner*—Robert K. Schaefer
*Assistant Examiner*—W. E. Duncanson, Jr.
*Attorney, Agent, or Firm*—J. H. Beusse

[57] ABSTRACT

The stator terminals of an adjustable speed a-c induction motor are connected to a source of d-c electric power by means of an inverter, and a system is provided for blending both dynamic and regenerative electrical braking of the motor whenever it decelerates. The brake blending system comprises a plurality of braking resistors respectively coupled by a corresponding switch in parallel with the power source. The switches are controlled by a control circuit which responds to motor terminal voltage, motor angular velocity and the difference between the commanded and actual motor torques to determine the additional current which the motor could regenerate without exceeding commanded parameters. When the additional current corresponds to that current which can be absorbed by adding an additional stage of braking resistance, the control circuit actuates a switch to add a stage of dynamic brake resistance. The control circuit also monitors the voltage of the source and removes braking resistance in steps to maintain source voltage within selected limits in order to maximize the current fed to the power source and thus maximize regenerated energy. In an alternate embodiment the control circuit determines the admittance of the source and utilizes the admittance to maintain source voltage substantially constant by removal of dynamic brake resistance in order to force more regenerative current to the source.

10 Claims, 2 Drawing Figures

DYNAMIC BRAKE BLENDING FOR AN INVERTER PROPULSION SYSTEM

BACKGROUND OF THE INVENTION

The present invention relates to braking controls for electric traction motors and, more particularly, to a braking control system for blending of dynamic and regenerative electrical braking of an inverter powered alternating current traction motor.

Traction vehicles such as locomotives or transit cars which are powered by electric traction motors generally depend upon electrical braking by the traction motors to assist mechanical or friction brakes in stopping the vehicle. In order to provide this electrical braking effort, the traction motors are electrically controlled to operate as electrical generators driven by the rolling wheels of the vehicle. In operating as generators, the traction motors are effective to convert the kinetic energy of the vehicle to electrical energy. The chosen method of disposing of this electrical energy classifies the type of electrical braking being utilized. In general only two types of electrical braking are in common use: dynamic braking in which the electrical energy is converted to thermal energy in resistive loads; and regenerative braking in which the electrical energy is transferred back to the power source.

It is obvious that regenerative braking is a preferred method to use if the power source is capable of accepting the "regenerated" energy and using it for other loads or storing it for later use. However, there are many instances in which a power source is not receptive or not available to accept this energy. In those instances the energy is necessarily dissipated in resistive loads by dynamic braking techniques. It will be apparent then that the use of either dynamic or regenerative braking will generally be dictated by the availability of a power source to accept the regenerated energy. When this availability is not a characteristic of the vehicle but is a variable depending upon certain operating conditions of the vehicle, both dynamic and regenerative braking ability may be incorporated into the vehicle control system with appropriate sensing apparatus for determining when to use dynamic braking and when to use regenerative braking.

Many vehicle control systems are designed for use where the receptivity of the power source itself is variable. For example, the power source may be external to the vehicle such as in electric locomotive or transit car applications in which power is obtained from an overhead catenary or third rail system. In these systems the power source is typically a substation supplying rectified direct current (d-c) power through a plurality of unidirectional conducting means. Accordingly, power cannot be regenerated backward through the unidirectional conducting means to the ultimate source; however, power may be regenerated into the wayside power distribution system for use by other vehicles which are drawing power from the system. The "source" receptivity will, therefore, depend upon whether other vehicles are drawing power from the source and the degree of receptivity will depend upon the number of vehicles drawing power and whether other vehicles are operating in a regenerative braking mode. This problem of power source receptivity has given rise to systems for effecting mixed regenerative and dynamic braking, the mixing process being commonly referred to as "blending."

A typical electrical brake blending system is shown in U.S. Pat. No. 3,657,625 in which a d-c traction motor and associated power system is connected to a d-c power source. For electrical braking the power system includes a dynamic brake resistor and series thyristor connected in parallel with the series combination of the motor armature and a stabilizing resistor. The motor system is connected to the d-c source by means of a diode and a series connected inductor with a capacitor connected between a return line of the power source and a junction intermediate the diode and inductor. During regenerative braking the capacitor voltage will rise if the power source is not receptive. Accordingly, a control system is connected to control the conduction time of the dynamic brake thyristor as a function of the voltage on the capacitor.

A modification of the above-described blending circuit is illustrated in U.S. Pat. No. 3,930,191 in which a pair of dynamic brake resistors and serially connected thyristors are coupled in parallel with the motor armature. This arrangement allows the use of a smaller value for the series stabilizing resistor (since the effective dynamic brake resistor can be varied over a wider range) and increases the efficiency of the system during regenerative braking since a smaller amount of energy will be dissipated as thermal energy in the smaller series connected stabilizing resistor.

In both of the above-described brake blending systems, the dynamic brake resistor-thyristor combination is connected in parallel with the d-c power system during braking. The power system for a d-c traction motor is typically a "chopper." The chopper is essentially a controlled switch which meters motor current by periodically opening and closing. The average value of motor current is thus regulated by varying the ratio of the open-time of the switch to the closed-time of the switch. In present day "solid-state" systems, the chopper includes a power thyristor in the motor current path and a commutation circuit connected in parallel with the power thyristor for applying a reverse voltage to effect turn-off of the power thyristor. Since the dynamic brake thyristor is connected essentially in parallel circuit arrangement with the chopper, it is apparent that the commutation circuit for the chopper can also be used to effect turn-off of the dynamic brake thyristor. Such a system is shown in U.S. Pat. No. 3,593,089. Because commutation circuits capable of operating at typical motor currents and voltages are expensive, this dual use of the chopper commutation circuit makes the use of a dynamic brake thyristor economical.

Persons skilled in the traction vehicle propulsion art are giving increasing attention to replacing d-c traction motors with lighter weight, more maintenance free alternating current (a-c) adjustable speed traction motors, preferably of the 3-phase induction motor type. Such an a-c motor is driven by a power system which can include a polyphase inverter or three single-phase inverters, one connected to each phase of the stator windings of the motor, for supplying 3-phase variable frequency a-c excitation. As is well known, an inverter comprises apparatus for converting d-c to a-c power and generally takes the form of a plurality of controlled switching devices arranged and controlled in a manner to cause current flowing in a load to periodically reverse directions. A detailed description of a plurality of inverters connected for supplying a-c power to a 3-phase a-c induction motor is given in applicant's U.S. Pat. No. 3,890,551 issued June 17, 1975, and assigned to the General Electric Company. As will be apparent from that patent, each phase of the inverter utilizes a pair of main current carrying controlled switching devices, typically thristors, serially connected between relatively positive and negative a-c source terminals, and an a-c load terminal is disposed between the thyristors. By gating on a first of these thyristors, voltage having the same polarity as one of the d-c terminals is applied to a load connected to the a-c terminal. By turning off the first thyristor and gating on the second, voltage of the other polarity is applied to the load. Thus, the inverter alternates the polarity of the potential on the a-c trminal, and the unipolarity source voltage is converted to an alternating load voltage.

As illustrated in the aforementioned U.S. Pat. No. 3,890,551, the main thyristors are paralleled by inversely poled diodes and are periodically turned off by the action of a commutation circuit including a capacitor-inductor ringing or oscillatory circuit which is controlled by an additional thyristor pair. A detailed description of such a commutation circuit is given in U.S. Pat. No. 3,207,974 — McMurray issued Sept. 21, 1965 and assigned to the General Electric Company.

As explained in the McMurray patent, for the commutating circuit to divert load current from the main thyristor, it must be capable of supplying a current equal to or somewhat greater than the actual load current through the main current carrying thyristor. Since the commutating current is provided from a capacitor, the current magnitude is a function of the initial voltage on the capacitor. Thus, if motor current increases while source voltage decreases, one of the main thyristors may fail to be commutated and a shoot-through or simultaneous conduction of both main thyristors can occur. A shoot-through condition places an undesirable short circuit on the d-c source. The possibility of commutation failure can be minimized by including protection circuits which maintain predetermined current-voltage relationships in the inverter. Such a protection circuit is illustrated in applicant's U.S. Pat. No. 3,859,579 issued Jan. 7, 1975, and assigned to the General Electric Company.

To implement the blending of regenerative and dynamic braking in an inverter powered 3-phase a-c induction motor system, a resistor-thyristor combination could be connected to each phase of the inverter a-c terminals. This would tend to minimize ripple currents created during dynamic braking. As an alternative to the use of three resistor-thyristor combinations connected on the a-c side of the inverter, a single resistor-thyristor braking circuit could be connected between the d-c terminals of the inverter. For this arrangement a series isolating resistor is preferably connected between the inverter and the braking circuit so that the voltage across the d-c terminals of the inverter can rise to a level sufficiently high to ensure successful commutation of the relatively large braking currents in the main thyristors. (The braking effort produced by the motor is directly related to the generated current.) The use of such an isolating resistor in an inverter powered system is described and claimed in the aforementioned U.S. Pat. No. 3,890,551 in which a dynamic brake resistor and switch are connected between the power source terminals. However, that patent does not disclose blending of regenerative and dynamic braking. Because of the isolating resistor, a dynamic brake thyristor could not be effectively commutated by the inverter commutation circuits and thus for "continuous" control of conduction time requires the use of a separate commutation circuit in the dynamic brake circuit. Since the dynamic brake circuit is connected across the d-c power source terminals, the separate commutation circuit for the dynamic brake thyristor would need to have sufficient capability to operate at source voltage and at a current level equivalent to the maximum rated motor current; however, the use of a commutation circuit of such capability in a braking circuit is economically unattractive.

SUMMARY OF THE INVENTION

It is an object of the present invention to provide an improved electrical brake blending system for an inverter powered propulsion system.

It is a further object of the present invention to provide an electrical brake blending system for a three-phase inverter powered a-c traction motor.

It is a still further object of the present invention to provide an electrical brake blending circuit for an inverter powered system for an electrical traction motor in which dynamic braking is advantageously implemented in a plurality of discrete stages.

In accordance with the present invention a three-phase a-c induction motor system powered from a three-phase inverter power system includes a plurality of parallel connected dynamic brake resistors, each resistor having a corresponding switch serially connected therewith and each serial combination of resistor and switch being connected in parallel with a d-c power source. The switches are controlled by a circuit which predicts a motor current deficit and selectively changes the states of the switches to maintain line voltage constant while changing motor current by a predetermined amount. The motor current deficit is established by allowing a protection circuit in the inverter system to reduce braking effort (and thus motor current) while holding inverter voltage constant at an overvoltage limit value. The step of resistance added by actuating a switch is chosen to be a value necessary to correct the predicted motor current deficit. If the line voltage drops below a predetermined limit value thus indicating that more current than necessary is being dissipated in the braking resistors, the switch control circuit will reverse the switch actuation sequence and increase the resistance of the dynamic braking circuit by deleting paralleled resistors.

In a preferred embodiment the switch control circuit calculates a current error value from monitored values of actual motor torque, commanded motor torque, motor angular velocity and inverter terminal voltage. The current error value is compared to a current threshold value and a switch actuation signal produced when the error value equals or exceeds the threshold value. The actuation signal is used to advance a digital counter, the counter output terminals being connected to operate the switches. By using binary weighted values for the braking resistors, three stages of resistors will result in seven steps of resistance. The control circuit causes the counter to count down and reverse the switch actuation sequence when line voltage falls below a predetermined value.

In an alternate embodiment the control circuit causes the counter to count down as a function of both regenerated line current and line voltage by estimating the admittance of the power source and computing a current error signal. The current error signal is computed as the current necessary to maintain the line voltage at a limit value based on the estimated admittance of the source. This approach allows the use of a smaller threshold value for changing the resistance of the braking circuit and thus increases regenerative current.

BRIEF DESCRIPTION OF THE DRAWINGS

These and other objects, features and advantages of this invention will be better understood by reference to the following detailed description when considered in conjunction with the accompanying drawings in which.

DETAILED DESCRIPTION OF THE INVENTION

Figure 1:
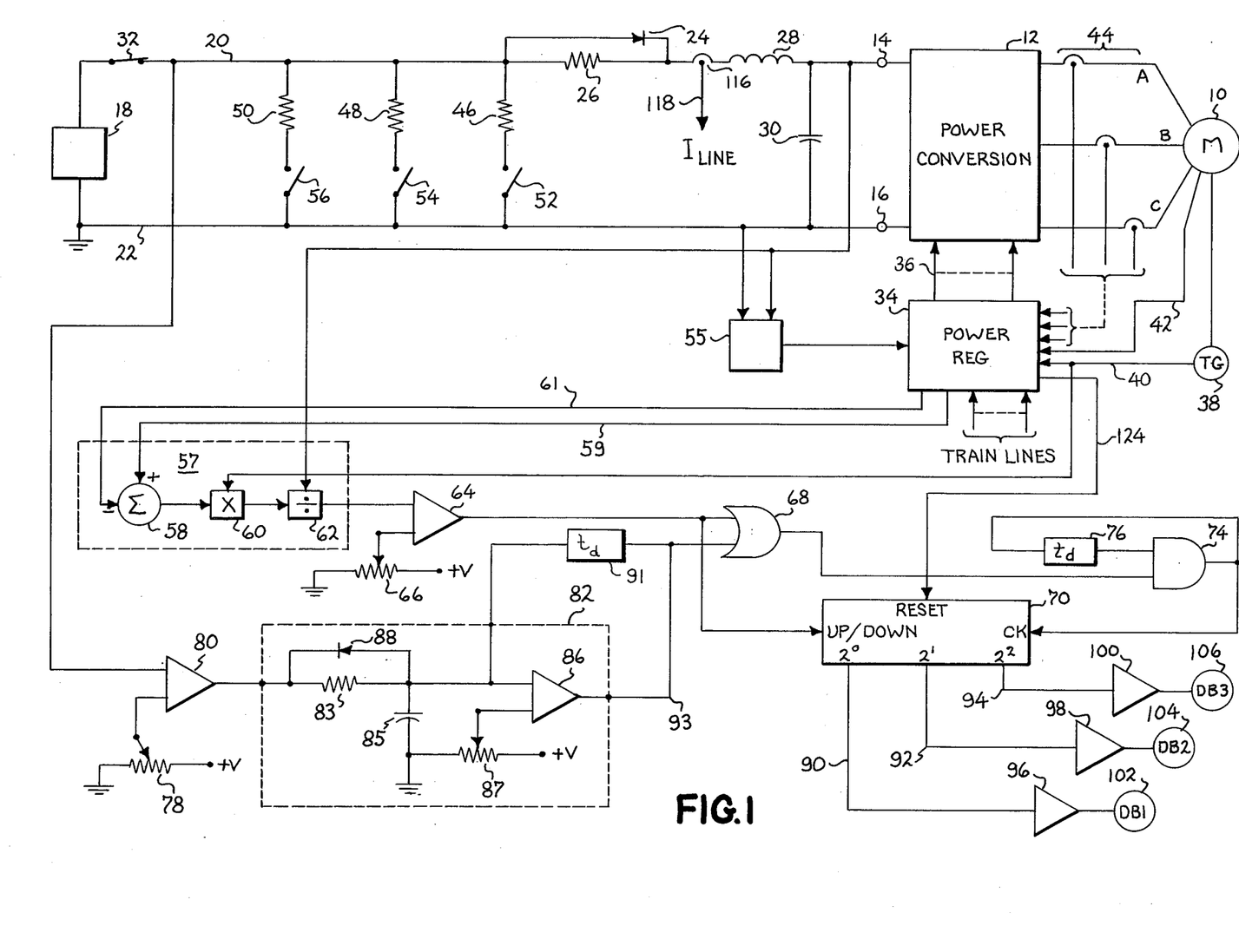
FIG. 1 is a simplified schematic of an a-c induction motor and inverter system incorporating one embodiment of a brake blending circuit according to the present invention.

Referring now to FIG. 1 an a-c traction motor propulsion system is seen to include a three-phase a-c induction motor 10 supplied with variable frequency, variable voltage a-c electric power from a power conversion apparatus 12 over lines A, B, and C. In a preferred embodiment power conversion apparatus 12 is a three-phase inverter of the type described in the aforementioned U.S. Pat. No. 3,890,551. Power is delivered to the input terminals 14 and 16 of conversion apparatus 12 from a power source 18 by means of conductors 20 and 22 respectively. A diode 24 and parallel connected isolating resistor 26 are serially connected with a filter reactor 28 in conductor 20. A filter capacitor 30 is connected between input terminals 14 and 16.

In electric traction vehicle applications such as locomotives or transit cars, the power source 18 typically comprises a third rail or overhead catenary and the vehicle includes a shoe or pantograph arrangement adapted to make sliding contact with the rail or cable. For ease of discussion power source 18 will hereinafter be understood to include not only a fixed source of rectified d-c power but also the entire third rail or cable distribution system and other traction vehicles connected to the system which may be drawing power therefrom or regenerating power thereinto. The voltage delivered at lines 20 and 22 may be, for example, a nominal 600 volts d-c which may vary from 450 volts to 750 volts d-c with transients up to 1600 volts peak magnitude. Inductor 28 and capacitor 30 comprise a low pass L-C filter which partially isolates the conversion apparatus 12 from power source 18 and reduces line transients. Diode 24 allows current from source 18 to bypass series resistor 26, which resistor 26 is utilized during electrical braking of motor 10. A circuit breaker 32 serially connected in conductor 20 functions to isolate the vehicle power system from power source 18 in the event of a malfunction. Such circuit breakers and control circuitry therefor are well known in the art and are thus not shown in detail.

The conversion apparatus 12 in the form of an inverter is controlled by a signal processing and regulating circuit 34 preferably of the type shown and described in applicant's U.S. Pat. No. 4,047,083 entitled "Adjustable Speed A-C Motor Drive With Smooth Transition Between Operational Modes And With Reduced Harmonic Distortion," assigned to the assignee of the present invention. In the referenced application regulator circuit 34 comprises a torque regulator and velocity control circuit controlling both the frequency and the magnitude of the a-c electric power delivered on lines A, B, and C to motor 10 during motoring and also controls the current generated by motor 10 during electrical braking. As disclosed therein the regulating circuit 34 derives from a plurality of input command signals, identified as "Train Lines," a first signal representing direction of motor rotation, i.e., forward or reverse, a second signal representing either a motoring or a braking mode of operation, a third signal representing desired velocity and a fourth signal representing desired torque. In turn, feedback signals representative of the actual values of these parameters are provided to the regulating circuit 34 whereby error signals are produced and result in modifications to the signals on lines 36 to conversion apparatus 12 in a manner tending to minimize the error signals. In particular, a tachometer-generator 38 is coupled to motor 10 and provides a feedback signal on line 40 proportional to actual motor armature angular velocity, a flux measuring apparatus (not shown) coupled to motor 10 provides a feedback signal on line 42 proportional to actual motor airgap flux, and current measuring means 44 coupled to lines A, B, and C provide feedback signals to regulating circuit 34 proportional to actual motor current.

During the electrical braking mode of operation, motor 10 acts as a generator producing a controlled current which is coupled back through power conversion apparatus 12 to power lines 20 and 22. If power source 18 is non-receptive to this regenerative current, the energy represented by this current can be dissipated in isolating resistor 26 and in dynamic braking resistors 46, 48, and 50 by conversion to thermal energy. This dynamic braking mode of operation is attained by selectively closing switches 52, 54, and 56 thereby connecting resistors 46, 48, and 50 respectively across the power lines 20 and 22. If power source 18 is receptive, regenerative braking may be implemented by opening switches 52, 54, and 56 and allowing the current generated by motor 10 to flow back to source 18. In the illustrative embodiment of FIG. 1, switches 52, 54, and 56 are shown as electromechanical contactors. However, it is to be understood that other types of switches such as gate turn-off thyristors may be employed where their power ratings comport with braking current magnitudes experienced in the circuit. It is also to be understood that more resistor braking stages could be employed if desired.

The power source 18 will in most instances be neither totally receptive nor totally non-receptive to regenerative current but will generally be capable of absorbing some percentage of the motor braking current. However, if the source 18 is excessively receptive, i.e., the source voltage is low, the inverter current will tend to rise while the inverter voltage will tend to fall. Since the impulse commutated inverter's ability to commutate current is dependent on the inverter d-c voltage, an excessively receptive line may result in damage to the power conversion apparatus 12 unless the commanded braking torque is reduced. At the other extreme of receptivity, the voltage of power source 18 will rise to an excessive level as regenerative current is pumped back and may result in damage to the semiconductor components of the power control system unless some action is taken to control the regenerative current. Accordingly, there is connected to power regulating circuit 34 a protection circuit 55 which establishes upper and lower voltage limits for power conversion apparatus 12 and operates to modify the braking or motoring torque commands in order to maintain the inverter voltage within the prescribed limits. Such a protection circuit is described in conjunction with an inverter power regulating circuit in applicant's aforementioned U.S. Pat. No. 3,859,579.

The inventive brake blending system operates in conjunction with regulating circuit 34 and the protection circuit 55 to increase regenerative braking while allowing braking effort to remain at a relatively high sustained level. More particularly the inventive brake blending system includes circuit means 57 responsive to selected operating parameters of the propulsion system for producing at an output terminl thereof an error signal representative of the difference between the actual magnitude of current generated by the motor 10 and the maximum magnitude of current which could be generated without exceeding the commanded torque output of the motor if the source 18 were totally receptive. In a preferred embodiment circuit means 57 is shown to include a summing junction 58 having a first input terminal connected to regulating circuit 34 for receiving a first signal on line 59 representative of commanded motor torque and a second input terminal connected to regulating circuit 34 for receiving a second input signal on line 61 representative of actual motor torque. At an output terminal of summing junction 58 there is therefore provided a torque error signal corresponding to the difference between the commanded motor torque and the actual motor torque. The output terminal of summing junction 58 is connected to a first input terminal of a multiplier circuit 60, a second input terminal of multiplier circuit 60 being connected to line 40 for receiving a signal corresponding to the actual angular velocity of the rotor of motor 10 whereby at an output terminal of multiplier circuit 60 there is produced a signal corresponding to the product of torque error and motor velocity. The output terminal of multiplier circuit 60 is connected to a first input terminal of a divider circuit 62, a second input terminal of divider circuit 62 being connected to terminal 14 at power conversion circuit 12 for receiving a signal proportional to the inverter d-c terminal voltage, whereby there is produced at an output terminal of divider circuit 62 a signal corresponding to torque error times motor velocity divided by inverter voltage. It will be appreciated by those skilled in the art that the signal developed at the output terminal of divider circuit 62 is proportional to current error. Accordingly, the presence of a positive magnitude signal at the output terminal of divider circuit 62 is an indication that additional current could be regenerated by the motor 10 without exceeding the commanded braking effort of the motor. It will be apparent that circuit means 57 may be implemented in ther ways. For example, the feedback signal representative of inverter terminal voltage could be eliminated since at the time that a torque error exists, the inverter terminal voltage will be held at a constant value corresponding to the inverter overvoltage limit as established by protection circuit 55. Thus the divider 62 is essentially dividing the error signal by a constant and this constant may be accounted for by suitable adjustment of potentiometer 66. This would allow divider 62 to be deleted from the illustrated circuit.

It is noted that the protection circuit described in applicant's aforementioned U.S. Pat. No. 3,859,579 is operable to establish a maximum overvoltage limit for the voltage appearing between terminals 14 and 16 of inverter 12 by forcing a reduction in the magnitude of the current generated by motor 10. It is this forced reduction in motor generated current which results in a torque error signal. If the inverter 12 is not limited by the protection circuit, the regulator circuit 34 will be effective to control motor current in a manner tending to maintain any difference between actual torque and commanded motor torque at essentially zero.

The error signal developed at the output terminal of circuit means 57 represents the additional current which motor 10 could generate without exceeding the commanded torque level at the present rotational speed and terminal voltage of the motor. When this error signal reaches a magnitude representative of the magnitudes of current which can be accommodated by making one step of resistance change in the dynamic braking circuit comprising resistors 46, 48, and 50, the error signal is utilized to activate a selected one of the switches 52, 54, and 56 to thereby provide an alternate parallel current path through a corresponding one of the resistors 46, 48, and 50 for the regenerative motor current. In particular, the output terminal of divider circuit 62 is connected to a first input terminal of a comparator 64, a second input terminal of comparator 64 being connected to a movable tap on a potentiometer 66 for receiving a predetermined threshold level voltage. A positive going or logic 1 signal is developed at an output terminal of comparator 64 when the error signal reaches or exceeds the magnitude of the threshold level voltage. Potentiometer 66 is connected between a source of voltage $+V$ and a reference or ground potential. The output terminal of comparator 64 is connected to a first input terminal of a logical OR gate 68 and also to an up/down input terminal of a multi-stage binary counter 70. An output terminal of OR gate 68 is connected to a first input terminal of an AND gate 74. AND gate 74 includes a feedback loop in which an output terminal of AND gate 74 is connected through a time delay circuit 76 to a second input terminal of gate 74. Time delay circuit 76 includes an input delay circuit which provides a predetermined delay time of, for example, 10 microseconds so that the output pulse from gate 74 will have sufficient width to assure that counter 70 is triggered. Circuit 76 also includes an output time delay for producing an output pulse of predetermined time duration. Time delay circuit 76 may comprise, for example, a monostable multivibrator with a resistor and capacitor input circuit for providing, upon receipt of a positive going input signal, delayed negative or iverted output signal for a predetermined time interval. The output terminal of AND gate 74 is also connected to a clock (ck) input terminal of binary counter 70 for providing clock pulses for incrementing counter 70.

The above-described circuitry operates to cause the counter 70 to count up or down as a function of the current error signal. More particularly, the signal developed at the output terminal of circuit means 57 corresponds to the predicted current error, i.e., the current which the motor is capable of generating without exceeding the commanded torque and without increasing the inverter d-c terminal voltage at terminal 14. The voltage set by potentiometer 66 as a threshold level is chosen to be that voltage corresponding to the voltage which will be developed at the output terminal of divider circuit 62 when one additional step of resistance can be added in the dynamic braking circuit without changing the inverter terminal voltage. The threshold level is made independent of motor velocity by appropriately modifying the torque error signal by the motor velocity signal in multiplier 60. Thus, comparator 64 provides an output signal when it is desired to increase the amount of braking current by one resistance step. This signal is applied to the up/down input terminal of binary counter 70 to control the direction of count of the counter. This signal is also applied through OR gate 68 and AND gate 74 to the clock input terminal of binary counter 70 to thereby cause counter 70 to increment upward by one count. Time delay circuit 76 rapidly forces the signal at the output terminal of AND gate 74 to revert to a low or logic zero level thereby resulting in a single relatively narrow clock pulse being applied to counter 70. The time delay provided by delay circuit 76 is selected to be adequate to allow an actuated contactor to change state before a second contactor is actuated, i.e., the circuit 76 prevents a second clock pulse from being applied to counter 70 until adequate time is provided to determine if a single step of resistance is sufficient to reduce the current error to less than the threshold level.

In addition to the contactor advance circuit there is also provided a retard circuit which will remove resistance from the braking circuit if the terminal voltage at source 18 drops below the retard threshold voltage as established by a potentiometer 78. This retard circuit includes a first comparator 80 having a first input terminal connected to line 20 and a second input terminal connected to a movable tap on potentiometer 78. Potentiometer 78 has a first terminal connected to a voltage V+ and a second terminal connected to a reference or ground potential. An output terminal of comparator 80 is connected to an input terminal of a time delay circuit 82 and an output terminal of circuit 82 is connected via lead 93 to a second input terminal of OR gate 68. Delay circuit 82 acts as a transient filter circuit to prevent stage changing of the dynamic braking resistors in response to transient voltage changes on lines 20 and 22. Such transients occur rather frequently in electric vehicle power distribution systems as a result of starting and stopping of vehicles connected to the system.

Time delay circuit 82 may comprise, for example, an R-C integrator including a resistor 83 and a capacitor 85 serially connected between the output terminal of comparator 80 and ground. A second comparator 86 has a first input terminal connected to a junction intermediate resistor 83 and capacitor 85. A second input terminal of comparator 86 is connected to a variable tap on a potentiometer 87 for receiving a threshold voltage whereby there is provided an output signal at an output terminal of comparator 86 when the voltage on capacitor 85 reaches or exceeds the threshold voltage. A diode 88 connected in parallel with resistor 83 provides a fast discharge path for capacitor 85 through a pull-down output stage of comparator 80. Diode 88 thus acts as a reset of time delay circuit 82 enabling the circuit 82 to ignore transient voltages which appear on lines 20 and 22. A typical time delay for circuit 82 will be in the order of one second.

The output pulse developed by time delay circuit 82 is terminated by a feedback loop including a time delay circuit 91 connected between the output terminal of comparator 86 and the anode terminal of diode 88. Delay circuit 91 may be, for example, similar to time delay circuit 76 with the inclusion of a current sink output stage whereby the charge on capacitor 85 is rapidly dissipated when circuit 91 is triggered by the output pulse from comparator 86 thus resetting time delay circuit 82. The resetting of time delay circuit 82 allows the subsequent production of an output pulse in the event that the dynamic brake resistance change affected by the first pulse is not sufficient to correct the low voltage condition at bus 20.

When the line voltage at line 20 falls below the level set by potentiometer 78, comparator 80 will produce a positive voltage level signal which will be applied to time delay circuit 82. If the line voltage remains below the level set by potentiometer 78 for a time interval at least sufficient to allow time delay circuit 82 to "timeout," a signal will be produced at the output terminal of circuit 82 and will be conducted via line 93 to OR gate 68, AND gate 74 and thus to the clock terminal of counter 70. Since obviously the source 18 is receptive under low line voltage conditions, the current error signal at the output terminal of circuit means 57 will be minimal and a low level signal will be applied from the output terminal of comparator 64 to the up/down terminal of counter 70 thereby causing counter 70 to count down upon receipt of a clock signal from AND gate 74. If the line voltage signal at the output of comparator 80 does not remain high for the time delay interval set by resistor 83, capacitor 84 and threshold potentiometer 87, then diode 88 will quickly reset the time delay. The circuit 82 thus acts as a digital filter to insure that momentary line voltage dips will not actuate counter 70.

In a preferred embodiment resistors 46, 48, and 50 are chosen to be binary weighted resistors thereby allowing seven steps of resistance to be implemented with only three resistor stages. Counter 70 provides binary output signals on lines 90, 92, and 94 which are coupled respectively to driver amplifiers 96, 98, and 100. Output terminals of amplifiers 96, 98, and 100 are connected respectively to switch actuator coils 102, 104, and 106, which switch actuator coils control the opening and closing of switches 52, 54, and 56. It will be appreciated that in some instances selected switches will be energized for closing at the same time that other switches are deenergized for opening. The switch actuator coils 102, 104, and 106 include circuitry (not shown) well known in the art which forces the switch closing time to be less than the switch opening time. This arrangement allows for continuous current flow during those instances in which some switches are opening while others are closing and thus prevents an open circuit condition from occurring. Time delay circuit 76 is set so that the propulsion system including control, motor and contactor delays will have time to respond to a command from comparator 64 before allowing the counter 70 to advance again.

Figure 2:
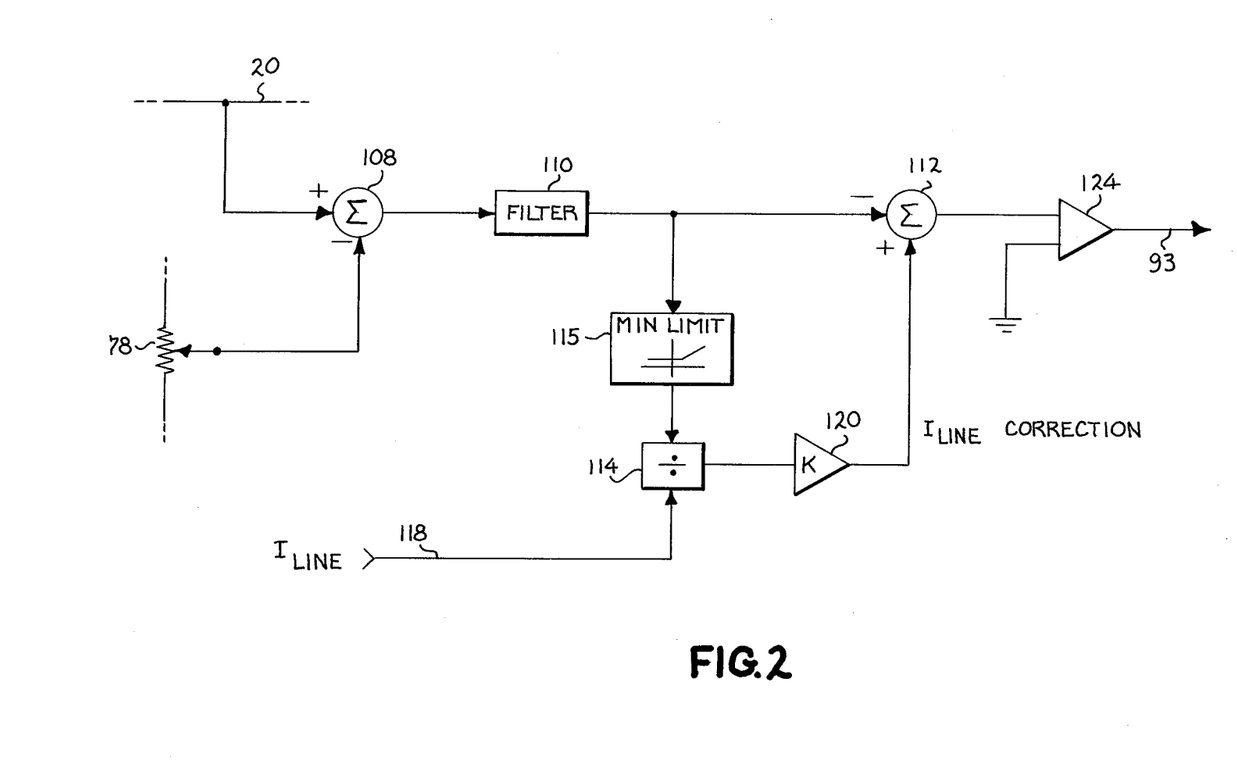
FIG. 2 is a simplified schematic of another embodiment of the dynamic brake retard portion of the circuit of FIG. 1.

Referring now to FIG. 2 there is shown an alternative embodiment of a circuit for controlling the removal of dynamic braking resistors as line voltage drops. This circuit responds to actual line current and modifies the line voltage threshold level to allow contactors to open at a higher line voltage as line current decreases. In particular, this circuit includes a first summing junction 108 having a first input terminal connected to receive a signal respresentative of the line voltage appearing at line 20 and a second input terminal connected to receive a signal from potentiometer 78 representative of a desired minimum threshold level, e.g., 650 volts. An output signal developed at an output terminal of summing junction 108 thus represents the difference between the actual line voltage and the threshold level.

The output terminal of summing junction 108 is connected through a suitable filter network 110 to a first input terminal of a second summing junction 112 and also to a first input terminal of a divider circuit 114 through a minimum limit circuit 15. Filter network 110 may be any of a number of well known types of filter networks such as, for example, an inductor-capacitor combination which serves to advantageously smooth the transients which inherently appear in the line voltage signal. Limit circuit 115 functions to prevent the voltage difference signal from being less than a minimum limit, e.g., 5 volts, in order to prevent divide by zero difficulties.

Divider circuit 114 operates to divide the difference signal at the output terminal of limit circuit 115 by the d-c line current. In this regard a signal representative of line current is supplied by current measuring means 116 (FIG. 1) over conductor 118 to a second input terminal of divider circuit 114. Divider circuit 114 is of a standard type such as a quarter-square divider shown and described in the text "Application Manual for Operational Amplifiers" published in 1968 by Philbrick/Nexus Research. The output signal developed by divider circuit 114 at an output terminal thereof is representative of the differential admittance or receptivity of source 18 and, after appropriate amplitude adjustment by amplifier 120, represents a current correction signal which is used to modify the voltage difference signal from filter network 110 to make the system responsive to both a voltage differential and to large currents. The current correction signal is conducted via line 122 to a second input terminal of summing junction 112 were it is combined with the voltage difference signal from filter network 110 to yield an error signal which is used to control the removal of the dynamic brake resistors. The error signal is compared with a zero threshold voltage signal in a comparator 124 to produce the clock signal which is applied via line 93 to cause counter 70 to increment downward by one count.

Since the arrangement of FIG. 2 compares the line voltage difference to the apparent receptivity of source 18, the error signal utilized to effect a step of resistance change may be made smaller. With a smaller error signal required for a resistance change, the magnitude of current regenerated to the source 18 can be maintained nearer optimum. The circuit tends to modify the threshold for retard detection as the regenerated line current increases, i.e., the threshold voltage is equivalently increased for high regenerated line current. The current is divided by the voltage error since a lower line voltage and high line current indicate a more receptive line. Thus a single resistor step represents a smaller line voltage change than with an open line due to the paralleling effect of the line impedance causing a smaller equivalent load change on the power conversion unit.

The inventive brake blending circuit is substantially inactive as long as the torque or braking effort of motor 10 can be controlled by regulating circuit 34. However, when the voltage between inverter terminals 14 and 16 rises to the predetermined overvoltage limit such that the protection circuit 55 is called upon to reduce regenerative current in order to maintain the inverter terminal voltage within the established limit, the actual torque or braking effort of motor 10 begins to deviate from the commanded torque. This deviation is detected by circuit means 57 and is converted therein to a current error signal. When the current error signal produced at the output of circuit means 57 reaches the magnitude established by potentiometer 66, comparator 64 will change the state of its output and produce a positive voltage level signal which is conducted through OR gate 68 and AND gate 74 to the clock input terminal of counter 70. Simultaneously, this positive voltage level will be applied to the up/down input terminal of counter 70 thereby enabling the counter to increment upward upon receipt of the signal at the clock terminal. The signal at the output of AND gate 74 will trigger time delay circuit 76 which will thereafter provide a low voltage signal to gate 74 and result in the output of gate 74 dropping to a low voltage level for at least an interval equipment to the time delay period of circuit 76.

Assuming that a single step of resistance is sufficient to reduce the torque difference signal and thus the current error signal to less than the threshold level set by potentiometer 66, the signal from comparator 64 will have reverted to a low voltage level by the time circuit 76 times-out and no further clock signals will be applied to counter 70. If the current error again increases, however, another clock signal will be applied and counter 70 will again increment.

Counter 70 includes a master reset input terminal to which there is applied a signal from regulating circuit 34 via line 124 indicative of whether the system is in a motoring or a braking mode of operation. During motoring this signal maintains each output of counter 70 at a logic 0 level whereby all the switches 52, 54, and 56 are maintained open. During braking this signal allows the counter to increment in response to clock signals. As will be apparent, on a first clock signal counter 70 will energize switch actuator 102 resulting in closure of switch 52. On a second clock signal counter 70 will energize switch actuator 104 to close switch 54 but will deenergize actuator 102 thereby allowng switch 52 to open. As previously noted the switch drop-out time is longer than the pick-up time in order to prevent open circuits. In this manner counter 70 sequentially counts upward energizing and deenergizing the switch actuators to selectively step through the available resistance stages.

If the source voltage begins to drop at line 20, comparator 80 will provide an output signal through time delay filter circuit 82, OR gate 68 and AND gate 74 to clock counter 70. When this situation exists the signal from comparator 64 will be at a low voltage level and since this latter signal controls the direction of count of counter 70, the counter will increment downward. This will clearly result in the switches 52, 54, and 56 being deenergized in the reverse order to that in which they were energized. The alternate circuit of FIG. 2 will likewise deenergize the switches in the reverse order; however, this circuit responds to line current and line voltage at a smaller differential and thus allows an increased amount of regenerative current.

The inventive system described herein provides an economical way of blending dynamic and regenerative braking in an inverter controlled a-c induction motor traction vehicle. The logic circuitry for controlling the switches has been illustrated as discrete hardware. It will be apparent, however, that the logic circuitry could be readily implemented by microprocessor techniques with a substantial saving of components. It is also apparent that more than three braking stages could be utilized to thereby increase the regenerated power by employing smaller resistor step changes. Accordingly, although the principles of the invention have now been made clear in an illustrated embodiment, there will be immediately obvious to those skilled in the art many modifications, constructions and arrangements particularly adapted for specific environments and operation requirements without departing from these principles. The appended claims are therefore intended to cover and embrace any such modifications as fall within the true spirit and scope of the invention.

What I claim as new and desire to secure by Letters Patent of the United States is:

1. In a traction motor propulsion system of the type comprising an adjustable speed a-c motor, a d-c power source, an inverter having d-c terminals connected to said source and a-c terminals connected to said motor, and control circuitry connected to the inverter and responsive to a commanded torque signal and to motor feedback signals for varying a parameter of the alternating voltage at the a-c terminals of the inverter so as to regulate the torque output of the a-c motor, the control circuitry including means for preventing the magnitude of inverter d-c terminal voltage during electrical braking from exceeding a predetermined maximum limit, an improved electrical brake blending system comprising:
   a. a plurality of braking resistors and a corresponding plurality of switches having conducting and non-conducting states, each of said resistors being serially connected to a corresponding one of said switches to thereby form a plurality of braking stages;
   b. means connecting each of said braking stages in parallel circuit arrangement with the d-c power source;
   c. circuit means responsive to motor torque, motor rotational velocity and inverter terminal voltage and operative during electrical braking when motor torque is less than commanded torque for producing an error signal representative of a change in motor current required to increase motor torque to said commanded torque; and
   d. switch control means responsive to said error signal achieving a predetermined value for changing states of selected ones of said switches to alter the combination of braking stages conducting current so as to increase the motor generated current.

2. The system as defined in claim 1 wherein said switch control means includes means responsive to the magnitude of voltage on said braking stages becoming less than a predetermined magnitude for selectively altering the combination of braking stages conducting current so as to increase the regenerative motor current.

3. The system as defined in claim 1 wherein said switch control means includes:
   a. first means for developing a first signal representative of the difference between the voltage magnitude of said d-c power source and a reference voltage magnitude;
   b. second means for providing a second signal representative of the magnitude of regenerated braking current;
   c. third means for dividing said second signal by said first signal to develop a third signal representative of the differential receptivity of said d-c power source;
   d. fourth means for summing said first signal with said third signal to produce a fourth signal when the sum of said first signal and said third signal exceeds a predetermined magnitude; and
   e. fifth means for applying said fourth signal for altering the combination of braking stages conducting current.

4. The system as defined in claim 2 wherein said switches comprise electromechanical contactors.

5. The system as defined in claim 3 wherein said switches comprise electromechanical contactors.

6. The system as defined in claim 2 wherein said switch control means comprises:
   a. means for providing a first signal when said error signal exceeds a predetermined value;
   b. means responsive to said first signal for providing a clock signal; and
   c. binary counter means having a clock input terminal for receiving said clock signal, a count direction control input terminal for receiving said first signal and a plurality of output terminals for producing binary output signals, each of said output terminals being connected to control a corresponding one of said switches wherein said first signal enables said counter to count in an up direction and said clock signal causes said counter to increment a single count to thereby selectively alter the combination of braking stages conducting current.

7. The system as defined in claim 1 wherein said means for producing said error signal comprises:
   a. summing means connected to receive a second signal representative of the commanded torque of the motor and a third signal representative of the actual torque of the motor, said summing means producing a torque error signal representative of the difference between said first and second signals; and
   b. multiplying means connected for multiplying said torque error signal by a signal representative of motor rotational velocity to thereby produce a fourth signal representative of said error signal.

8. The system as defined in claim 7 wherein said means for producing said error signal further comprises divider means connected to receive said fourth signal and to receive a fifth signal representative of the inverter terminal voltage, said divider means being effective to divide said fourth signal by said fifth signal to produce said error signal.

9. The system as defined in claim 8 wherein said switch control means comprises:
   a. means responsive to said voltage magnitude at said braking stages being less than a predetermined magnitude for producing a sixth signal;
   b. means responsive to said sixth signal for producing a delayed signal after a predetermined time interval; and
   c. means responsive to said delayed signal for incrementing said counter downward thereby selectively altering the combination of braking stages conducting current.

10. In a vehicle control system including an a-c electric traction motor, an inverter having d-c terminals connected to a d-c power source and a-c terminals connected to the motor, regulating means responsive to a torque command signal for controlling the invertor, and mechanical means coupling the motor in driving relationship to a wheel of the vehicle, an improved electrical braking system comprising:
   a. a plurality of resistors;
   b. a plurality of switches, each of said switches being serially connected to a corresponding one of said resistors, to form a resistor-switch combination, each of said resistor-switch combinations being connected in parallel with the power source;

c. means for determining the actual braking torque of the motor;
d. means connected for comparing the actual braking torque to the torque command signal and for producing a torque error signal;
e. filter means connected to an output terminal of said comparing means, said filter means being effective to block transient signals appearing at the output terminal of said comparing means;
f. multiplying means having a first input terminal connected to the output terminal of said filter means and a second input terminal connected to receive a signal proportional to the rotational velocity of the motor armature, said multiplying means producing, at an output terminal thereof, an output signal proportional to the product of said two input signals;
g. dividing means having a first input terminal connected to the output terminal of said multiplying means and second input terminal connected to receive a signal proportional to the voltage at the d-c terminals of the inverter, said dividing means producing at an output terminal thereof an output signal proportional to the dividend of said signals at said two input terminals;
h. first comparison means having a first input terminal connected to the output terminal of said dividing means and a second input terminal connected to receive a predetermined current threshold signal, said comparison means producing an output signal at an output terminal thereof when the first input signal has a greater magnitude than said current threshold signal;
i. second comparison means having a first input terminal connected to receive a signal proportional to the voltage of the d-c power source and a second input terminal connected to receive a voltage threshold signal proportional to a predetermined minimum desired d-c source voltage, said comparison means producing an output signal when said d-c power source voltage signal is less than said voltage threshold signal;
j. a logic circuit connected to receive said output signals from said first and second comparison means, said logic circuit producing a first output signal in response to signals from said first comparison means and a second output signal in response to signals from said second comparison means;
k. counter means connected to receive said first and second signals from said logic means, said counter means being connected to count in a first direction upon receipt of said first signal and in a second direction upon receipt of said second signal, said counter means having a plurality of output terminals for providing a binary representation of a count stored in said counter; and
l. means connecting the output terminals of said counter to said switch means whereby said switch means are logically controlled by the count in said counter.

* * * * *

UNITED STATES PATENT OFFICE
CERTIFICATE OF CORRECTION

PATENT NO. : 4,093,900
DATED : June 6, 1978
INVENTOR(S) : A. B. Plunkett

It is certified that error appears in the above-identified patent and that said Letters Patent are hereby corrected as shown below:

Column 14, line 43, change "8" to -- 6 --

Signed and Sealed this

Seventh Day of November 1978

[SEAL]

Attest:

RUTH C. MASON
Attesting Officer

DONALD W. BANNER
Commissioner of Patents and Trademarks